US005643534A

United States Patent [19]

Minevski

[11] Patent Number: 5,643,534
[45] Date of Patent: Jul. 1, 1997

[54] CORROSION INHIBITOR FOR ALKANOLAMINE UNITS

[75] Inventor: Ljiliana V. Minevski, The Woodlands, Tex.

[73] Assignee: BetzDearborn Inc., Trevose, Pa.

[21] Appl. No.: 504,634

[22] Filed: Jul. 20, 1995

[51] Int. Cl.$^6$ .............................. C23F 11/00; C09K 13/00
[52] U.S. Cl. ........................... 422/12; 422/7; 422/13; 422/239; 252/389.62; 423/228; 423/229
[58] Field of Search .......................... 422/7, 12, 13, 422/239; 507/939; 166/310; 423/228, 229; 252/389.62; 106/14.24, 14.23

[56] References Cited

U.S. PATENT DOCUMENTS

| | | | |
|---|---|---|---|
| 3,896,044 | 7/1975 | Mago et al. | 252/192 |
| 4,062,764 | 12/1977 | White et al. | 208/348 |
| 4,120,655 | 10/1978 | Crambes et al. | 422/15 |
| 4,466,946 | 8/1984 | Goddin, Jr. et al. | 423/228 |
| 4,730,079 | 3/1988 | Hofinger et al. | 560/196 |
| 4,927,669 | 5/1990 | Knox et al. | 427/239 |
| 5,292,480 | 3/1994 | Fischer et al. | 422/12 |

OTHER PUBLICATIONS

Copending U.S. Patent Application Ser. No. 08/504,635, "Oxygen Induced Corrosion Inhibitor Compositions", by Minevski, filed Jul. 20, 1995.

*Primary Examiner*—Sharon Gibson
*Assistant Examiner*—Deanna Baxam
*Attorney, Agent, or Firm*—Alexander D. Ricci; Matthew W. Smith

[57] ABSTRACT

A method for inhibiting corrosion of metals in contact with an aqueous alkanolamine solution in an amine unit for removing of acid gases from a hydrocarbon, comprising adding to the solution a sufficient amount of a corrosion-inhibiting composition comprising a blend of salicylic acid with a reaction product of maleated tall oil fatty acid polyhydroxy polyalkane and ammonium or potassium hydroxide; tallow diamine quaternary dichloride or alkanediol or mixtures thereof, and alkanol or alkanolamine. The blend may be diluted in water and may optionally include an antifoam material.

7 Claims, No Drawings

CORROSION INHIBITOR FOR ALKANOLAMINE UNITS

FIELD OF THE INVENTION

The present invention relates to corrosion inhibiting compositions. More particularly, the present invention relates to corrosion inhibiting compositions which are comprised of water soluble hydroxybenzoic acid compositions and the use of the compositions to inhibit corrosion of metals in contact with aqueous alkanolamine solutions in acid gas removal amine units.

BACKGROUND OF THE INVENTION

Corrosion is the electrochemical reaction of metal with its environment. It is a destructive reaction which, simply stated, is the reversion of refined metals to their natural state. For example, iron ore is iron oxide. Iron oxide is refined into steel. When steel corrodes, it forms iron oxide which may result in failure or destruction of the metal causing a system to be shut down until necessary repairs can be made.

When crude oil and natural gas are removed from a formation they frequently contain $CO_2$ or $H_2S$ (acid gases). Acid gases are commonly removed from the hydrocarbon in an acid gas removal amine system (amine unit). An amine unit utilizes an alkanolamine such as monoethanolamine (MEA), diethanolamine (DEA), methyldiethanolamine (MDEA), diisopropylamine (DIPA), diglycolamine (DGA), or triethanolamine (TEA) diluted in water as an amine solvent. The hydrocarbon containing acid gases are contacted with the amine solvent in a tray or packed absorber where the amine solvent reacts with the acid gases thereby removing them from the hydrocarbon. The amine-acid gas reaction is later reversed in a plate or packed stripper resulting in an acid gas stream and a reusable amine solvent.

Amine units present a variety of corrosion control problems. Unreacted carbon dioxide dissolved in the aqueous alkanol amine solvent forms acid species which are corrosive to metals. Oxygen can enter an amine unit through storage tanks, sumps, surge vessels, and the like and attack metals causing corrosion. Oxygen also can oxidize the alkanolamine. Oxidation products of alkanolamines cause metal corrosion. Efforts to control corrosion in amine units usually focus on the use of metallurgy, minimization of acid gas flashing, filtration, stress relieving, process controls and chemical corrosion inhibitors. These measures help reduce corrosion in amine units but do not eliminate the problem. Since corrosion if left untreated, can cause shut-down of an amine unit, corrosion control is a very important consideration.

Accordingly, a need exists for compositions which when added to an aqueous alkanolamine solution in an acid gas removal amine unit inhibits $CO_2$ and $O_2$ induced corrosion of ferrous metals in contact with the aqueous alkanolamine solutions.

PRIOR ART

U.S. Pat. No. 4,927,669 to Knox et al. discloses a corrosion inhibitor formulation including the reaction product of maleic anhydride or fumaric acid with unsaturated fatty acids. The formulation is disclosed as having utility in a method to inhibit corrosion in downwell oil field equipment and piping.

U.S. Pat. No. 5,292,480 to Fischer et al. discloses a corrosion inhibitor for metal parts which may be produced by first reacting $C_{18}$ unsaturated fatty acids with maleic anhydride or fumaric acid to produce the fatty acid Diels-Alder adduct or the fatty acid-ene reaction product. The adduct or reaction product is further reacted with a polyalcohol to form an acid-anhydride ester corrosion inhibitor. The ester may be further reacted with amines, metal hydroxides, metal oxides, ammonia and combinations thereof to neutralize the ester. The corrosion inhibitor is disclosed as having utility in a method to inhibit corrosion in oil field equipment and piping. Surfactants and carrier solvents are also disclosed.

U.S. Pat. No. 3,896,044 to Mago et al. discloses that corrosion of metals by aqueous alkanolamine solutions used in acid gas removal service can be inhibited by combinations of antimony and vanadium compounds, stannous salts, organo-tin compounds, nitro aromatic acids and their salts, or benzotriazole.

U.S. Pat. No. 4,062,764 to White et al. discloses that corrosion in petroleum refining distillation units can be controlled by addition of a film-forming amine such as methoxypropylamine, ethoxypropylamine, methoxyethylamine and the like.

SUMMARY OF THE INVENTION

To achieve the foregoing objects, the present invention provides water soluble compositions for inhibiting corrosion of metals in contact with aqueous alkanolamine solutions. The compositions are comprised of aqueous blends of hydroxybenzoic acid with a reaction product of maleated tall oil fatty acid polyhydroxy polyalkane ester and ammonium or potassium hydroxide; tallow diamine quaternary dichloride or alkanediol or mixtures thereof; alkanol or alkanolamine and optionally an antifoaming agent.

The invention also provides a method for inhibiting corrosion of metals in contact with aqueous alkanolamine solutions. The method comprises adding an amount of the invention composition, to an aqueous alkanolamine solution, sufficient to establish a concentration of the composition in the aqueous solution which is effective for the purpose of inhibiting metal corrosion induced by $CO_2$ alone or $CO_2$ and $O_2$.

DETAILED DESCRIPTION OF THE INVENTION

In accordance with the present invention, a composition and method for inhibiting corrosion of ferrous metals in aqueous alkanolamine solutions is provided. The present inventor has discovered that a corrosion inhibitor comprising a hydroxybenzoic acid formulation when added to an aqueous alkanolamine solution significantly inhibits $CO_2$ and $O_2$ induced corrosion of metals, in contact with the alkanolamine solution, in acid gas removal amine units.

In particular, the present inventor has found that a corrosion inhibitor comprising a blend of a hydroxybenzoic acid; a reaction product of maleated tall oil fatty acid polyhydroxy polyalkane and ammonium or potassium hydroxide; tallow diamine quaternary dichloride or alkanediol or mixtures thereof; alkanol or alkanolamine; diluted in water and optionally including an antifoam material inhibits $CO_2$ and $O_2$ induced ferrous metal corrosion.

The preferred hydroxybenzoic acid is o-hydroxybenzoic acid commonly referred to as salicylic acid. The preferred alkanediol is hexylene glycol. The preferred alkanol is ispropanol and the preferred alkanol amine is triethanolamine.

The corrosion inhibiting composition is preferably supplied as a concentrate to be diluted for use. The concentrate may comprise from about 5 to about 10 weight percent hydroxybenzoic acid; from about 20 to about 30 weight percent of a reaction product of maleated tall oil fatty acid polyhydroxy polyalkane and ammonium or potassium hydroxide; from about 5 to about 15 weight percent tallow diamine quaternary dichloride in a glycol or alkanediol; from about 15 to about 30 weight percent alkanol or alkanolamine; up to about 50 weight percent water and up to about 10 weight percent of an antifoam composition.

The antifoam composition can be any antifoamer compatible with the other composition components. The preferred antifoamer is a 10% dimethylpolysiloxane emulsion in water.

The treatment level of corrosion inhibiting composition effective to inhibit corrosion of metal in contact with an aqueous alkanolamine solution is a concentration of the composition in an aqueous amine solution of from about 50 to about 5000 parts per million (ppm). The preferred treatment level is from about 50 to about 2000 ppm and the most preferred treatment level is from about 100 ppm to about 300 ppm.

In order to show the efficacy of inhibiting $CO_2$ and $O_2$ induced corrosion of metals in contact with aqueous alkanolamine solutions, various tests were performed. The results are presented herein for purposes of illustration and not limitation.

EXAMPLE I

A standard three electrode system was used for evaluating corrosion rates in the absence and the presence of inhibitor. The testing conditions were those simulating $CO_2$ amine service. An aqueous/acidified amine phase was used in the temperature range from 66°–93° C. The corrosive environment consisted of carbon dioxide ($CO_2$) saturated, 35 weight percent diethanolamine (DEA) solution containing 10,000 parts per million (ppm) formic acid (HCOOH), 8,000 ppm acetic acid ($CH_3COOH$), 500 ppm hydrochloric acid (HCl) and the balance water. Mild steel 1018 discs in glass electrochemical cells were used as working electrodes. The solution was continuously purged with $CO_2$. Experiments were performed at working temperatures of 66°, 82° and 93° C. Treatment levels varied from 100–300 ppm. The compositions tested were prepared at a temperature range of 50°–60° C. The weight percents of each composition component is shown in Table I. Samples were tested for 18 hours using potentiodynamic polarization equipment. Potential in the range of −20 to +20 millivolt versus open circuit potential was applied in small increments and resulting specimen current was measured. Potentiodynamic measurements yielded curves of current (I) versus potential (E) and the reciprocal of the slope of the curve (dE/dI) at the corrosion potential was measured and used to determine corrosion rate. The test results are shown in Table II. The results are shown in percent protection as determined by calculated corrosion rates using Stern-Geary Equation/ EG&G and/or Gamry Corrosion Software and the equation: $\%P=[(CRb-CRi)/CRb]\times 100$, where %P is percent protection, CRb is the corrosion rate of the blank and CRi is the corrosion rate of the treated system.

TABLE I

| No. | Composition: Percent by Weight | | | | | | | | |
|---|---|---|---|---|---|---|---|---|---|
| | $H_2O$ | SA | W5560 | TQDT-HG | IPA | SAG10 | W3520 | TEA | HG |
| SAW #7 | 31 | 9.2 | 21 | 14 | 24.8 | — | — | — | — |
| SAW #7.2 | 26 | 9 | 21 | 14 | 25 | 5 | | | |
| SAW #9 | 40 | 8 | — | — | — | — | 28 | 17 | 7 |
| SAW #9.2 | 35 | 8 | — | — | — | 5 | 28 | 17 | 7 | where SA is salicylic acid;

W5560 is a reaction product of maleated tall oil fatty acid and polyhydroxy polyalkane ester and ammonium hydroxide at 82% actives available commercially from Westvaco;

TQDT-HG is 75% active tallow diamine quaternary dichloride in hexylene glycol available commercially from Exxon;

IPA is isopropanol;

SAG10 is 10% dimethylpolysiloxane emulsion in water available commercially from Union Carbide.

W3520 is a reaction product of maleated tall oil fatty acid polyhydroxyalkane ester and potassium hydroxide at 86% actives available commercially from Westvaco;

TEA is triethanolamine; and

HG is hexylene glycol.

TABLE II

| | Percent Corrosion Protection | | | |
|---|---|---|---|---|
| Temperature | 66° C. | | 82° C. | 93° C. |
| Concentration | 100 ppm | 200 ppm | 200 ppm | 200 ppm |
| Corrosion Inhibitor | | | | |
| SAW #7 | 80 | 92 | 80 | 89 |
| SAW #7.2 | — | — | — | 96 |
| SAW #9 | 82 | 93 | 87 | 88 |
| SAW #9.2 | — | — | — | 96 |

Table II shows that corrosion inhibitor compositions containing salicylic acid provided up to 96% corrosion protection to metals exposed to $CO_2$ saturated alkanolamine.

EXAMPLE II

An acidified DEA solution as described in Example I was purged with a mixture of $CO_2$ and $O_2$ gases. The flow rates of the gases were adjusted to correspond to $O_2$ concentrations of 0.17 ppm and 0.69 ppm in the DEA solution. The temperature was maintained at 93° C. and the treatment levels of the corrosion inhibitors were 200 ppm. The results are shown in Table III as percent of corrosion protection.

TABLE III

| Corrosion Inhibitor | Percent Corrosion Protection | |
|---|---|---|
| | 0.17 ppm $O_2$ | 0.69 ppm $O_2$ |
| SAW #7 | 89 | 97 |
| SAW #9 | 88 | 85 |

Table III shows that corrosion inhibitor compositions containing salicylic acid provided up to 97% corrosion protection to metals exposed to $CO_2$ and $O_2$ in an aqueous alkanolamine solution.

EXAMPLE III

An acidified DEA solution as described in Example I was purged with a mixture of $CO_2$ and $O_2$ gases. The flow rates of the gases were adjusted to correspond to $O_2$ concentrations of 0.17 and 0.69 ppm in the DEA solution. The temperature was maintained at 82° C. The DEA solutions were treated with 200 ppm of a solution of Westvaco WS 5560 (described in Table I) dissolved in water to 21 weight percent actives. The results are shown in Table IV as percent corrosion protection.

TABLE IV

| Corrosion Inhibitor | Percent Corrosion Protection | |
|---|---|---|
| | 0.17 ppm $O_2$ | 0.69 ppm $O_2$ |
| WS 5560 | 79 | 67 |

Table IV shows that an aqueous solution of the reaction product of maleated tall oil fatty acid and polyhydroxy polyalkane ester and ammonium hydroxide, when used alone, provided less corrosion protection than the corrosion inhibiting compositions containing hydroxybenzoic acid shown in Tables II and III.

EXAMPLE IV

Mild steel 1018 (Cartest) samples were placed within an autoclave and submerged in an acidified DEA solution containing 300 ppm of SAW #7 as described in Example I. A second set of samples were placed in the autoclave and submerged in the acidified DEA solution containing 300 ppm of SAW #9 also as described in Example I. The autoclave temperature was maintained at 127° C. and a $CO_2$ partial pressure was maintained at 20 psi. The samples were rotated at 100 rotations per minute for 18 hours. Under these conditions SAW #7 provided 88% protection while SAW #9 provided 93% protection.

EXAMPLE V

The invention corrosion inhibitors were tested to determine their tendency to foam. Three 250 milliliter (mL) samples of 35% DEA solution as described in Example I were treated with corrosion inhibitors. A fourth 250 mL sample was left untreated to serve as a blank. The samples were placed in 500 mL cylinders having condenser heads. The cylinders were heated to 93° C. and sparged with nitrogen through a fine pore fret (size D) at 900 mL/min. The time for the foam to rise from the 250 mL line to its highest point and the time for the foam to fall back to the 250 mL line were recorded. The results are shown in Table V.

TABLE V

| | | | Time of Foaming | |
|---|---|---|---|---|
| Corrosion Inhibitor | Treatment Level (ppm) | Max Foaming Point (mL) | UP 200° F. $N_2$ = 900 mL/min (sec) | DOWN 200° F. $N_2$ = 0 (sec) |
| SAW #7.2 | 300 | 315 | 1–2, n = 5 | 1–2, n = 5 |
| SAW #9 | 300 | over the top @ 50° C., $N_2$ = 100 mL/min | too foamy | too foamy |
| SAW #9.2 | 300 | over the top @ 55° C., $N_2$ = 100 mL/min | too foamy | too foamy |
| Blank | 0 | 430 | 6.6 ± 0.5, n = 5 | 6.8 ± 0.4, n = 5 | where n is the number of times the test was conducted.

As shown in Table V, SAW #7.2 was less foamy than the blank and SAW #9 and SAW #9.2 were too foamy to accurately measure.

Thus, the instant invention provides hydroxybenzoic acid containing compositions which, when added to aqueous alkanolamine solutions, effectively inhibit corrosion of metals induced by $CO_2$ alone and $CO_2$ and $O_2$. The compositions have particular utility for inhibiting corrosion in amine units which remove acid gases from a hydrocarbon.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A method for inhibiting corrosion of metals in contact with an aqueous alkanolamine solution utilized in an amine unit for removing acid gases from a hydrocarbon, said method comprising adding to said solution from about 50 to about 5000 parts per million of a corrosion inhibiting composition comprising:

(a) from about 5 to 10 weight percent salicylic acid;
    (b) from about 20 to about 30 weight percent reaction product of maleated tall oil fatty acid polyhydroxy polyalkane and ammonium or potassium hydroxide;
    (c) from about 5 to about 15 weight percent tallow diamine quaternary dichloride or alkanediol or mixtures thereof;
    (d) from about 15 to about 30 weight percent alkanol or alkanolamine;
    (e) up to about 50 weight percent water; and
    (f) up to about 10 weight percent antifoaming agent.

2. The method according to claim 1 wherein said composition comprises:

(a) from about 5 to about 10 weight percent salicylic acid;
    (b) from about 20 to about 25 weight percent reaction product of maleated tall oil fatty acid polyhydroxy polyalkane and ammonium hydroxide;
    (c) from about 10 to about 15 weight percent of a mixture of about 75 weight percent tallow diamine quaternary dichloride and about 15 weight percent hexylene glycol;
    (d) from about 20 to about 30 weight percent isopropanol;
    (e) up to about 35 weight percent water; and (f) up to about 10 weight percent antifoaming agent.

3. The method according to claim 1 wherein said composition comprises:

(a) from about 5 to about 10 weight percent salicylic acid;

(b) from about 25 to about 30 weight percent reaction product of maleated tall oil fatty acid polyhydroxy polyalkane and potassium hydroxide;

(c) from about 5 to about 10 weight percent hexylene glycol;

(d) from about 15 to about 20 weight percent triethanolamine;

(e) up to about 45 weight percent water; and (f) up to about 10 weight percent antifoaming agent.

4. The method according to claim 1 wherein said antifoaming composition is an aqueous dimethylpolysiloxane emulsion.

5. The method according to claim 1 wherein said acid gas is $CO_2$.

6. The method according to claim 1 wherein said amine unit contains $O_2$.

7. The method according to claim 1 wherein said composition is low foam forming when added to said aqueous alkanol amine solution.

* * * * *